United States Patent Office 3,410,894
Patented Nov. 12, 1968

3,410,894
PROCESS FOR THE PREPARATION OF AROMATIC POLYCYCLIC DIBASIC THIO-ACID SALTS AND PRODUCTS THEREOF
William F. Wolff, Park Forest, Ill., assignor to Standard Oil Company, Chicago, Ill., a corporation of Indiana
No Drawing. Filed Aug. 31, 1965, Ser. No. 484,084
7 Claims. (Cl. 260—502.6)

ABSTRACT OF THE DISCLOSURE

Thio acid aromatic compounds and the process for their preparation which includes reacting at a temperature of about −20° C. to −60° C. at least one member of the group consisting of carbonyl sulfide and carbon disulfide with a liquid mixture of (I) naphthalene, anthracene and phenanthrene; (II) an alkali metal wherein the molar ratio of alkali metal to the aromatic hydrocarbons is 2:1, (III) in the presence of a sufficient amount of methyl ether to dissolve the reactants.

---

This invention relates to thio acids of aromatic compounds and to a process for their preparation.

It has been discovered that salts of sulfur-containing acids can be prepared from the reaction of carbonyl sulfide or carbon disulfide with a liquid mixture of a polycyclic aromatic compound such as naphthalene or diphenyl, an alkali metal such as sodium, and a methyl ether such as dimethyl ether or methyl ethyl ether. The acid from carbonyl sulfide contains dibasic thio acids and that from carbon disulfide contains dibasic dithio acids. These acids and their salts and esters are useful as chemical intermediates in the preparation of acids, aldehydes, etc., as additives in lubricating oil, particularly as a corrosion inhibitor, and as agricultural chemicals.

The liquid mixture is treated with carbonyl sulfide or carbon disulfide or a mixture of the two. The carbonyl sulfide is usually present as a gas while the carbon disulfide is usually present as a liquid.

The liquid mixture includes a polycyclic aromatic compound having a half-wave potential less negative than that of diphenyl, particularly a conjugated polycyclic aromatic compound, and especially a polynuclear aromatic compound since these are readily identifiable and produce highly desirable products. Generally, it is desirable and preferred that naphthalene be present to promote the reaction. The half-wave potential of the polycyclic aromatic compound is a convenient measure of the compound's ability to form complexes.

Methods for measuring half-wave potentials of aromatic compounds are known and described in the literature such as Kolthoff, I. M., and Lingane, J. J., Polarography, 2nd Ed., 1952, and Kirk, R. E., and Othmer, D. F., Encyclopedia of Chemical Technology, vol. 10, pp. 886–901. Half-wave potentials of typical polycyclic aromatic compounds are −2.70 volts for diphenyl, −2.50 volts for naphthalene and −1.94 volts for anthracene.

Examples of suitable polycyclic aromatic compounds are the polyphenyls such as diphenyl, triphenyl, quaterphenyl, hexaphenyl, etc., the polynuclear aromatics such as naphthalene, anthracene, naphthacene, phenanthrane, chrysene, pyrene, etc., and the heterocyclics such as acridine, phenanthridine, thianaphthene, etc. Other examples of aromatic compounds with the desired half-wave potential are known as easily determined by measurement of their half-wave potential.

These compounds may be substituted or unsubstituted. The preferred substituents are hydrocarbons such as the lower alkyls (1–6 carbon atoms) and especially methyl.

The liquid mixture also includes an alkali metal such as lithium, sodium, potassium, rubidium and cesium with sodium and potassium being preferred and especially sodium because of the very favorable yields from these metals.

In addition, a methyl ether is also part of the liquid mixture. Methyl ether describes ethers having at least one methyl group attached to an oxy (—O—) group in the ester. Examples of methyl ethers are dimethyl ether, methyl ethyl ether, methyl propyl ether, dimethoxy ethane, dimethoxy propane, dimethoxy butane and the like, with dimethyl ether being preferred because of the highly desirable results from its use.

Generally, two molecules of sodium are required for every molecule or polycyclic aromatic compound in the mixture and usually an excess of the aromatic compound is preferred. It is believed that the sodium forms a complex with the aromatic compound in the presence of the methyl ether, this complex being indicated by a color change. Generally, the methyl ether is added in sufficient quantities to dissolve the reactants and to form the complex. Typically, when naphthalene is the aromatic, 888 ml. dimethyl ether is sufficient with 128 g. naphthalene and 25.6 sodium.

The reaction is generally carried out at low temperatures, in the order of −20° C. to −60° C., with the aid of such cooling systems as a knock back condenser filled with a Dry Ice-acetone mixture or a Dry Ice bath, and preferably, with ethers whose reflux temperature is within the temperature range. The flask or container is first purged of any air after which the desired quantity of methyl ether is added. The polycyclic aromatic compound and the alkali metal are then added. It is desirable that no water be present because of the presence of the alkali metal. Normally, it is helpful and preferable to add naphthalene to promote the formation of the desired complex.

Carbonyl sulfide or carbon disulfide is then introduced into the liquid mixture. A rate of about 200 ml. per minute for carbonyl sulfide gas has been found desirable when the liquid mixture is made up from 128 g. naphthalene, 25.6 g. of sodium, and 888 ml. of dimethyl ether. Usually the color of the complex changes indicating the occurrence of the reaction and determines the time of reaction.

The reaction results in a product containing alkali metal salts of thioacids, the acids being derivatives of the polycyclic aromatic compound. For example, when the polycyclic aromatic compound is naphthalene, the salt contains that of a dibasic thioacid of dihydronaphthalene and particularly that of a dibasic thioacid of 1,4-dihydronaphthalene, (1,4-dihydro thionaphthalic acid). When anthracene is the polycyclic aromatic compound, the salt contains that of a dibasic thioacid of dihydroanthracene and particularly that of a dibasic thioacid of 9,10-dihydroanthracene. Other examples include the salts of dibasic thioacids, of dihydrodiphenyl, dihydro hexaphenyl, dihydro phenanthrane, dihydrophenanthridine, etc. This process is particularly suitable for preparing substituted acids such as methyl thionaphthalic acids from methylnaphthalenes since the hydrocarbon substituent remains unchanged. The alkali metal salt may be recovered or the acid or ester may be recovered. The methyl ether is generally removed by evaporation. A selective solvent such as toluene may be present. When naphthalene is present and the sodium salt is prepared, the salt precipitates in the evaporative process while the unreacted naphthalene dissolves in the toluene. The salt is filtered and washed with additional quantities of selective solvent to remove any remaining polycyclic aromatic compound.

The acid or ester may be prepared from the salt. Generally, the acid is prepared by dissolving the salt in a solvent such as water, and the solutions acidified to produce an acid prepicitate. In some instances, the acid may hydrolyze and it is then preferred to prepare the ester from the salt by treating the salt with an alkylating agent such as benzyl chloride (preferably with a promoter such as triethyl amine), ethyl chloroformate, allyl bromide, diethyl sulfate and the like. The ester is generally recovered by distillation.

The above-described methods of recovering the alkali metal salt, the thioacid or its ester are illustrative only. Only methods of recovering an alkali metal salt, a thioacid or its ester are known and available to those of ordinary skill in the art.

The following example illustrates one embodiment of this invention. It will be understood that this is for illustrative purposes only and does not purport to be wholly definitive with respect to conditions or scope.

EXAMPLE

Anhydrous dimethyl ether as a gas was passed into a previously flamed 2-liter 3-necked flask fitted with an electrically driven stainless steel paddle stirrer, a knockback condenser filled with Dry Ice and acetone, and a three-way stop-cock for the introduction of gas into the vapor phase.

One hundred twenty-eight grams of naphthalene were poured into the flask and the flask was cooled in a large Dry Ice bath, after which the dimethyl ether addition was continued until the ether and naphthalene gave a total liquid-plus-solid volume of one liter. Addition of dimethyl ether was then discontinued and 25.6 grams of freshly cut sodium was added under a nitrogen atmosphere. After completion of the sodium addition, the Dry Ice bath was lowered and the stirrer speed was increased to medium from slow. Within 21 minutes the flask contents were greenish-black and after an additional hour they were black. The Dry Ice bath was then raised part way and carbonyl sulfide was introduced at a rate of about 200 cc. per minute. After half an hour the flask contents were still black and the Dry Ice bath was again lowered. After a total time of three hours the flask contents were yellow and addition of the carbonyl sulfide was stopped.

The dimethyl ether was then allowed to evaporate, with stirring in the presence of about 300 ml. of toluene. The total product was then filtered on a large Buchner filter and the filter cake was washed with toluene to remove unreacted naphthalene and other hydrocarbons. The solid was then returned to the cleaned and dried flask, where it was heated and stirred with 250 cc. benzyl chloride and 5 ml. triethyl amine under a nitrogen atmosphere. The mixture was cautiously heated to 100° C. and held at this temperature for one hour. The flask contents were cooled, filtered on a large Buchner funnel and thoroughly washed with toluene to obtain one liter of a red toluene solution of the dibenzyl ester of dihydromonothio naphthalic acid. A 40 ml. portion of this solution was heated to 70° C. under a vacuum of 0.15 mm. Hg to remove the toluene and unreacted benzyl chloride, leaving undistilled 5.80 grams of the crude ester of dihydromonothio naphthalic acid as a cherry red liquid.

This corresponded to a 60 percent (wt.) yield of the ester from sodium. The crude ester contained 12.76 weight percent sulfur as compared with the theoretical value of 14.90 weight percent. It was then distilled under vacuum to give overhead fractions containing 14–16 weight percent sulfur.

The above results demonstrate that a dibenzyl ester of dihydromonothio naphthalic acid was prepared by the reaction of carbonyl sulfide with a liquid mixture of naphthalene, sodium and dimethyl ether. This ester contained 14–16 weight percent sulfur as compared to the theoretical value of 14.90 weight percent.

It is seen from the above discussion that an alkali metal salt of a dibasic thioacid can be prepared in the inventive process. Useful products, salts, acids and esters result from this process. These products possess highly desirable properties for use as agricultural chemicals, lubricating oil additives and as chemical intermediates.

Thus having described the invention, what is claimed is:

1. As a composition of matter an alkali metal salt of a thio carboxylic acid prepared by reacting at a temperature of about −20° C. to −60° C. at least one member of the group consisting of carbonyl sulfide and carbon disulfide with a liquid mixture of (I) a bicyclic or tricyclic ring aromatic hydrocarbon selected from the group consisting of naphthalene, anthracene and phenanthrene; (II) an alkali metal wherein the molar ratio of the alkali metal to the bicyclic or tricyclic ring aromatic hydrocarbon is about 2:1, (III) in the presence of a sufficient amount of dimethyl ether to dissolve the reactants.

2. The compound of claim 1 wherein said alkali metal is sodium.

3. The ester of claim 1 wherein said acid is a dibasic monothio acid of dihydronaphthalene.

4. The ester of claim 1 wherein said acid is a dibasic monothio acid of dihydroanthracene.

5. A process for preparing an alkali metal salt of a thio carboxylic acid, said process comprising reacting at a temperature of about −20° C. to −60° C. at least one member of the group consisting of carbonyl sulfide and carbon disulfide with a liquid mixture of (I) a bicyclic or tricyclic ring aromatic hydrocarbon selected from the group consisting of naphthalene, anthracene and phenanthrene; (II) an alkali metal wherein the molar ratio of the alkali metal to the bicyclic or tricyclic ring aromatic hydrocarbon is about 2:1, (III) in the presence of a sufficient amount of dimethyl ether to dissolve the reactants.

6. The process of claim 5 wherein said member is carbonyl sulfide.

7. The process of claim 5 wherein said metal is sodium.

References Cited

UNITED STATES PATENTS

| | | | |
|---|---|---|---|
| 2,396,879 | 3/1946 | Porter et al. | 260—455 |
| 3,299,122 | 1/1967 | Wolff | 260—500 |
| 2,023,793 | 12/1935 | Scott | 260—665 |
| 3,193,590 | 7/1965 | Hsieh | 260—665 |

OTHER REFERENCES

Wooster et al.: J.A.C.S. vol. 53 (1931) pp. 179 to 187.

Qdias Goldschmid "Zurhewn der Alka Poly Arom. Kohl and ihrer ums" (1959) pp. 1, 8, 13, 17, 18, 30, 35, 41, 42, 43, 44, 45, 46, 53.

CHARLES B. PARKER, Primary Examiner.

D. R. PHILLIPS, Assistant Examiner.